United States Patent [19]

Hundal

[11] 3,962,082
[45] June 8, 1976

[54] LIQUID METAL COLD TRAP
[75] Inventor: Rolv Hundal, Greensburg, Pa.
[73] Assignee: The United States of America as represented by the United States Energy Research and Development Administration, Washington, D.C.
[22] Filed: Mar. 28, 1975
[21] Appl. No.: 563,273

[52] U.S. Cl. ................................ 210/71; 210/179; 210/184; 210/440
[51] Int. Cl.² ........................................ B01D 35/06
[58] Field of Search ..................... 55/208, 309, 387; 75/66; 210/71, 85, 179, 180, 183, 184, 440; 266/37

[56] References Cited
UNITED STATES PATENTS
2,375,232   5/1945   McNitt ............................. 210/180 X
2,826,264   3/1958   McIlvaine ............................ 55/309
3,405,926   10/1968  Davey .................................. 266/37
3,618,770   11/1971  Pohl et al. ......................... 210/179 X
3,693,959   9/1972   Swinhoe et al. ................... 210/71 X Primary Examiner—Thomas G. Wyse
Assistant Examiner—Robert H. Spitzer
Attorney, Agent, or Firm—Dean E. Carlson; Kenneth L. Cage; Roger S. Gaither

[57] ABSTRACT

A cold trap assembly for removing impurities from a liquid metal being provided with a hole between the incoming impure liquid metal and purified outgoing liquid metal which acts as a continuous bleed means and thus prevents the accumulation of cover gases within the cold trap assembly.

6 Claims, 1 Drawing Figure

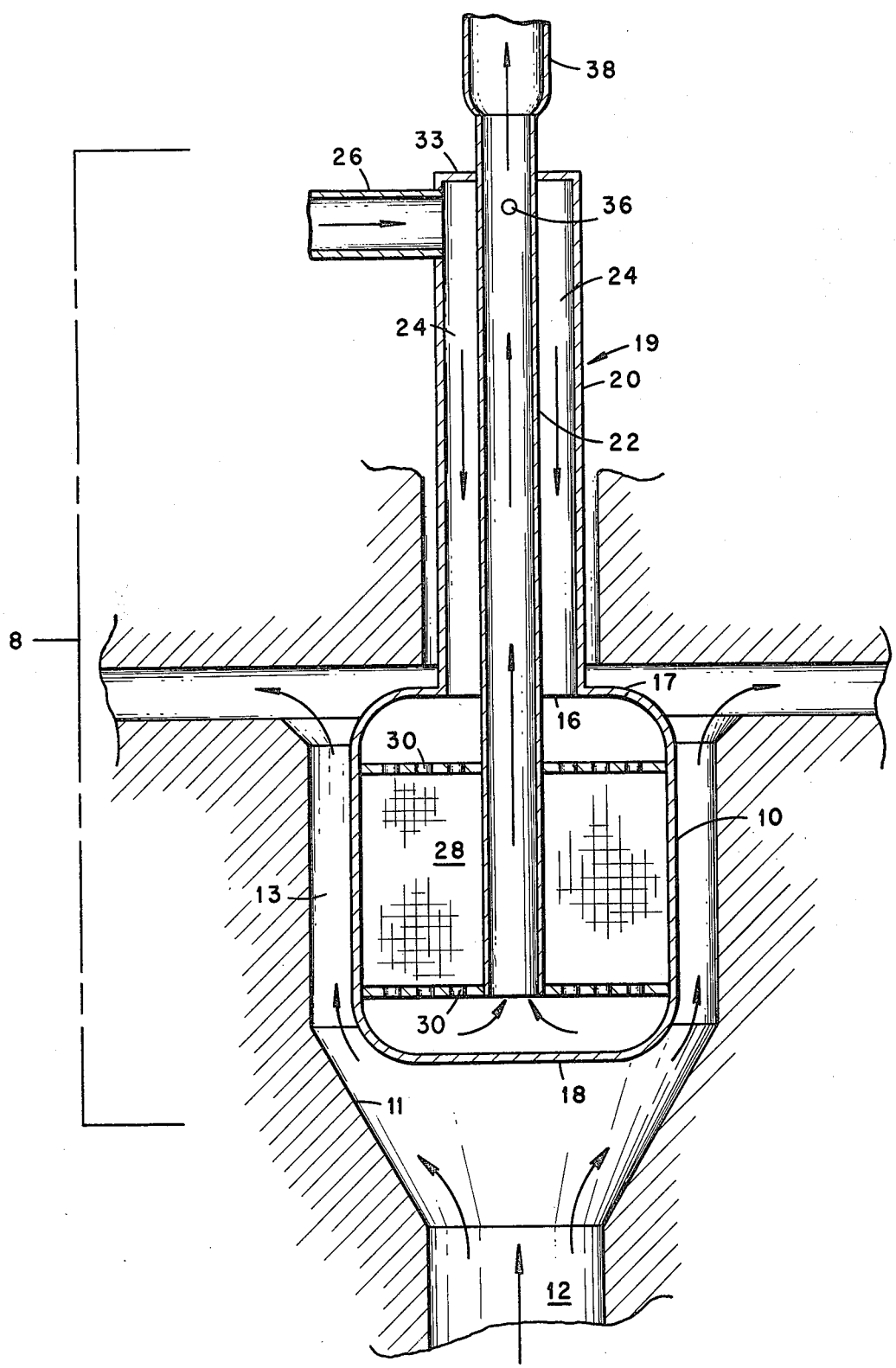

LIQUID METAL COLD TRAP

The invention described herein was made in the course of, or under, a contract with the U.S. Atomic Energy Commission.

BACKGROUND OF THE INVENTION

This invention relates to a cold trap and more particularly to a cold trap assembly for a liquid metal that has an entrained gas that must be removed. While this invention has particular utility in a nuclear reactor cold trap assembly for the liquid metal coolant to remove entrained cover gases, the cold trap of this invention has utility in many types of apparatus and processes, whether they be chemical processes, conventional heat exchangers, or fossil fuel power plants, just to name a few.

Basic components of a cold trap assembly for liquid metals are the baffle assembly or crystallization element upon which the impurities in the liquid metal precipitate or nucleate, a container for enclosing the crystallization element, a cooling system (gas or liquid) for cooling the liquid metal in the container, and the associated piping, structural supports and necessary control instrumentation. Generally a cold trap assembly also includes a regenerative heat exchanger, so as to minimize system heat losses and total heat removal requirements of the cold trap assembly. As described herein, the cold trap assembly will be called a cold trap unless otherwise specified.

During the operation of liquid metal loop systems used for heat transport in nuclear reactors, impurities are formed by reactions in and with the liquid metal coolant, and these impurities become entrained or dissolved in the liquid metal. These impurities may be transported around the loop system to produce plugging, corrosion, confuse instrumentation, or other deleterious effects unless trapped or filtered out. Cold traps are part of a liquid metal purification system and are used to remove dissolved impurities from the liquid metal by cooling part of the liquid metal to a temperature below the saturation temperature of the impurity. Cold trapping as a method of removing impurities in a liquid metal is based upon solubility-temperature relationships, with the solubility high at high temperatures and low at low temperatures. This cooling occurs in a temperature environment provided with nucleation sites for impurity formation and retention, and thus there is a cleaning or purifying of the liquid metal. Cold traps are designed to produce precipitation or nucleation of the impurities in a known location in a controlled manner and may operate at the lowest temperature of any component in the liquid metal cooling system.

A description of a cold trap appears on pages 138–139 of *Fast Reactor Technology: Plant Design* edited by John G. Yevick, The M.I.T. Press (1966). Examples of patents on cold traps are U.S. Pat. No. 3,554,374 filed by Roy C. Blair et al., on July 2, 1968 and U.S. Pat. No. 3,618,770 filed by Lawrence E. Pohl et al., on Feb. 4, 1970, each assigned to the assignee of the present invention. As shown in U.S. Pat. No. 3,618,770, which is herein incorporated by reference, a cold trap assembly directs a portion of the bulk stream of liquid metal coolant in a nuclear reactor cooling system to be by-passed through a heat economizer or regenerative heat exchanger and then channeled into a cold trap container where heat rejection takes place. As the temperature of the liquid metal is reduced, the impurities in the coolant nucleate or precipitate leaving a purified liquid metal. In a typical prior art cold trap, the flow is based on the idea that the liquid metal must reside for a short time, as short as 5 minutes, in the cold trap to effectively remove the impurities. For large liquid metal coolant systems, size of the cold trap assembly and flow rates through the cold trap have been based on a residence time greater than the 5 minute residence time in the typical cold trap, and the entire inventory of liquid metal is to be turned over or flow through the cold trap within the range of 12 to 36 hours. Some cold traps for nuclear reactors or large experimental facilities are designed for flow rates of 100 gallons per minute, but generally the maximum flow for an individual cold trap is 60 to 80 gallons per minute for reasons of economy in heat rejection and reliability of the components. Small liquid metal facilities may have cold traps designed for as low as 0.1 gallon per minute. Some cold traps have been demonstrated to show reliable performance at trapping temperatures as low as 230°F, resulting in oxygen levels of 0.1 to 1.5 parts per million. Generally cold traps using a gas as the coolant for cooling the liquid metal in the container will have flow rates of less than 20 gallons per minute, since the heat transfer coefficient of gases are less than that for liquids. The number of cold trap assemblies attached to liquid metal system will range from one to as many as are needed consistent with the economics of the system.

While sodium is one of the most common liquid metal coolants used in nuclear reactors, other well known liquid metals that could be used as coolants are: lead, lithium, mercury, potassium and sodium-potassium alloys. Hydrogen and oxygen are the major soluble impurities in a sodium system, but some of the additional impurities are other interstitials (carbon and nitrogen), or tritium and zenon and other corrosion products.

In the cooling loops using a liquid metal for heat transport, a temperature gradient will be established between the "hot leg" portions and "cold leg" portions. When the liquid metal used as the coolant in the loops is sodium, as in the case of liquid metal fast breeder reactors (LMFBR's), a cover gas must be used for occupying all gas spaces contiguous with the surfaces of the liquid sodium to prevent reactions, impurity formations and adverse effects, such as corrosion. The cover gas is usually an inert gas such as argon or helium. During circulation of the liquid metal coolant through the loops, some of the cover gas will become entrained or dissolved in the liquid metal. Solubility of cover gases in liquid metal is dependent upon the temperature with the solubility high at high temperatures and low at low temperatures. During liquid metal purification in a cold trap where impurities are nucleated or precipitated, as the temperature of the liquid metal decreases, a major portion of the various dissolved cover gases reach the temperature of saturation solubility and thus these gases are released into the cold trap assembly. The "released" cover gases are absorbed by or dissolved in the liquid metal in the "hot leg" portions of the cooling system at the liquid metal-cover gas interface. The efficiency of the removal of impurities by a cold trap assembly will be reduced as a result of the "released" cover gases occupying a part of the cold trap volume. The reduced volume available for the liquid metal to occupy will make less of the surface area available for heat transfer and precipitation and this reduces the efficiency of the cold trap and decreases the residence time for sodium in the cold trap. In addition, a sudden release of accumulated cover gas from the cold trap into the main loop of the liquid metal coolant system can cause severe flow perturbations, which in many cases have heretofore caused loop dumps, or severe perturbations during reactor operation so as to effect the operation of a nuclear reactor.

Prior art devices have attempted to deal with this problem of cover gas accumulation by installing an accumulator in the cold trap loop downstream of the cold trap which collects all the released cover gas. However, the liquid metal level in such an accumulator must be constantly monitored and cover gas venting must be performed at regular intervals. Insofar as these problems of cover gas accumulation are not confined to small sodium loops, it can be readily expected that larger cover gas bubbles in the sodium of a large liquid metal fast breeder reactor (LMFBR) could cause severe problems in the core region by blanketing the fuel elements.

SUMMARY OF THE INVENTION

It is therefore a primary object of this invention to prevent degrading of the efficiency of a cold trap assembly by preventing cover gases from accumulating and occupying part of the cold trap volume.

It is also an object of the present invention to prevent the accumulated cover gas in the cold trap from suddenly releasing into the main sodium liquid metal coolant loop and causing flow perturbations.

It is also an object of the present invention to provide a continuous bleed means between the liquid metal entering and exiting from the cold trap assembly.

It is also an object of the present invention for a part of the liquid sodium coolant of a liquid metal fast breeder reactor to by-pass the cold trap assembly and thus redissolve the accumulated cover gases released in a cold trap assembly during cooldown of the coolant.

It is also an object of the present invention to have some of the "impure" liquid sodium entering a cold trap assembly by-pass the cold trap container by flowing through a vent means and combining with the "purified" liquid sodium leaving the cold trap container.

Applicant recognized the problem of cover gas accumulation and subsequent large bubble release into the main coolant system and has discovered a new, improved and novel solution not heretofore known. Applicant has found that the accumulation of cover gas in the cold trap can be prevented or substantially reduced by providing at least one bleed hole in the cold trap assembly between positions adjacent the inlet and outlet of the liquid metal. By means of this bleed hole, a continuous and controlled venting of the cover gas from the cold trap assembly is accomplished without the formation of any sudden release of large bubbles into the main loop of the liquid metal system. The problems of cover gas releases into and accumulation in the cold trap assembly and the subsequent bubble releases into the main coolant system, do not appear to have been recognized by the prior art recited in U.S. Pat. Nos. 3,554,374 and 3,618,770. Applicant's invention solves this problem of cover gas accumulation in the cold trap and is a novel and effective solution to the problem. The cold trap efficiency is increased with the continuous bleed hole of this invention as a result of the decreased volume of cover gas residing in the cold trap.

BRIEF DESCRIPTION OF THE DRAWING

The FIGURE is a cross-section of an elevation view of the preferred embodiment of the cold trap assembly with the bleed hole concept of this invention.

DETAILED DESCRIPTION OF THE INVENTION

Hereinbelow is a detailed description of a preferred embodiment of the invention although it is quite apparent to anyone having ordinary skill in the art that most prior art cold traps could be modified with the novel bleed hole concept of this invention.

Referring now to the drawing, the improved cold trap assembly 8 comprises a cold trap container or crystallizer tank 10 positioned in a housing or support structure 11. The support structure 11 is constructed to define a cold trap coolant inlet 12 with the cold trap container 10 positioned within the support structure 11 so as to define a coolant passageway 13 around the container 10. The cold trap assembly 8 is provided with means, not shown, for a secondary coolant, either gas or liquid, to flow over and around the container 10 in passageway 13, as shown by the flow arrows in the FIGURE. This secondary coolant will sufficiently cool the liquid metal in the cold trap to a temperature below the saturation temperatures of the impurities that must be precipitated or nucleated out of the liquid metal. The cold trap container 10, is cylindrical in shape, although any shape could do, and is closed at one end, the bottom end, by a closing member 18 and has a partial closing member 17 at its other end, the upper end, with an axial opening 16 in that member 17. The preferred embodiment of the container 10, as shown in the FIGURE, is shaped like a "round jar with a long bottle neck". The "long neck" on the container 10 is an outer tube 20 making up the outer shell of the economizer or regenerative heat exchanger 19. The outer tube 20 is attached at one end to member 17 of container 10 covering the opening 16, and at the other end it has a liquid metal inlet 26 and an annular shaped end closing ring 33 covering that other end. Longitudinally and axially extending within the outer tube 20, through the end closing ring 33, and projecting into the cold trap container 10 is a smaller diameter inner tube 22. While the economizer 19 has an annulus 24 defined between outer tube 20 and a single inner tube 22, it would be well within the skill of an artisan to have a plurality of inner tubes 22 positioned within the economizer 19, as is common in the heat exchanger arts. This plurality of inner tubes 22 would be connected to plenum regions at each end of the economizer and would provide for increased heat transfer surface area.

In the cold trap container 10 two spaced apart perforated plates 30 are centrally positioned around the inner tube 22 and located between the closing members 17 and 18 to provide support for the baffle assembly or crystallization element 28. Typically, a large surface area is formed in the baffle assembly or crystallization element 28 in the form of stainless steel mesh or other suitable material well known in the art, which element 28 is used to facilitate nucleation and precipitation of the dissolved or entrained impurities.

The inner tube 22 extends from a point adjacent the lower most perforated plate 30, and closing member 18, axially up through the outer tube 20 and out through the inner annular hole in the end closing ring 33 where it connects with the return tube 38. The inner and outer surfaces of the inner tube 22 form the heat transfer surfaces of the economizer 19 between the hot incoming (impure) liquid metal and the cooler outgoing (purified) liquid metal. The outer surface of the outer tube 20 is insulated so that as much of the heat from the hot incoming liquid metal flowing downwardly through the annulus 24 can be transferred to the cooler outgoing liquid metal flowing upwardly through the inner tube 22. This counter flow heat transfer regenerates or heats up the outgoing liquid metal. The outer surface of the cold trap container 10 has a secondary coolant, either gas or liquid, which flows over it and cools the liquid metal in the cold trap container 10 to a temperature below the saturation temperature of the impurities to be removed. The outer surfaces of both the cold trap container 10 and the inner tube 22 could have fins or other means of increasing the heat transfer surface area, should the conditions warrant.

In a cold trap assembly of the type as shown in the FIGURE, but without the bleed hole means of this invention, the hot (impure) liquid metal enters the cold trap through inlet tube 26 and flows through the economizer 19 where it is cooled by the outgoing (purified) liquid metal. Some release of the dissolved cover gas and impurities may occur during the cooldown of the liquid metal in the economizer 19. Cooling of this incoming (impure) liquid metal will continue and increase in the cold trap container 10 as a result of a secondary coolant flowing around and transporting heat from the container. This secondary coolant flow is the only "external" heat removal for the cold trap assembly. When the temperature of the liquid metal drops down to a temperature below the saturation temperature of the entrained cover gases and impurities in that liquid metal, then the cover gases will be released into the cold trap assembly and the impurities will precipitate or nucleate out of the liquid metal onto the baffle assembly 28. The liquid metal, "cleaned" or "purified" by the release of the impurities and cover gases, will then flow out of the cold trap container 10 and through the economizer 19 where it is continuously heated by the hot incoming (impure) liquid metal. The cover gases, "released" into the volumes of the cold trap and economizer, not having the bleed means of this invention, will accumulate into large bubbles which periodically surge with the "cleaned" liquid metal out into the main stream of the liquid metal coolant system. There has been no effective method, before this invention, of sufficiently controlling the "released" cover gas within the cold trap and preventing these bubble surges and the accompanying harmful side effects.

In the present invention, at least one small bleed hole 36 is drilled through the wall of the inner tube 22 at a location in the economizer 19 adjacent inlet tube 26 and end closing ring 33. The bleed hole 36, or plurality of bleed holes, will allow a small amount of the hot incoming liquid metal containing cover gases and impurities to by-pass the cold trap container 10 by flowing through the bleed hole 36 and then combining with the "cleaned" or "purified" liquid metal leaving the economizer. The "released" cover gases in the economizer 19 and cold trap container 10 will usually accumulate in the upper part of the economizer adjacent the bleed hole 36 where it will then flow out the bleed hole 36 with the liquid metal that by-passes the cold trap. The amount of by-pass flow of the liquid metal is generally determined by the size and position of the bleed holes and pressure differential between the incoming "impure" and the outgoing "purified" liquid metals. In a full-scale liquid metal cooled nuclear reactor, the cold trap should have at least one bleed hole of a size to allow a total by-pass flow in the range of from about 1%–20% of the liquid metal flowing into the cold trap. A self-cleaning feature of this invention is that deposits of impurities which initially could tend to plug the bleed holes will be redissolved as the total quantity of impurities in the liquid metal of the total reactor coolant system are reduced. Furthermore, any tendency of the cover gases to redissolve in the liquid metal will also reduce the actual amount of cover gas in the by-pass flow. Should a type of economizer and/or cold trap container, other than that described herein, be used as the cold trap assembly incorporating the by-pass concept of this invention, it would be quite apparent to anyone skilled in the art that the number of bleed holes, the bleed hole size, and location of the bleed holes would have to be such that the "released" cover gas by-pass the cold trap and prevent accumulation in the cold trap.

In the embodiment shown in the FIGURE, the following are examples of relative sizes of the parts making up the cold trap assembly designed for a small liquid metal test facility and rated for a flow of 0.1–0.2 gallons per minute, length of outer tube 20—30 inches; length or height of cold trap container 10—10 inches; diameter of cold trap container 10–4 inches O.D.; diameter of outer tube 20—1 inch O.D.; diameter of the inner tube 22—⅜ inch O.D.; and the diameter of the bleed holes range from 0.025 inches to 0.054 inches. It is understood that these are relative sizes and are not the only relative sizes for which the by-pass concept of this invention could operate effectively within a cold trap assembly. Examples of the temperatures of liquid sodium passing through the cold trap that could effectively precipitate out the impurities are: 1200°F at the inlet tube 26, 230°F at the bottom of the cold trap before entering the inner tube 22 and 1150°F for the "cleaned" or "purified" sodium after passing through the heat exchanger 19. The flow rates of the liquid metal through the cold trap and the time the liquid metal resides in the cold trap of this invention are within the ranges and values described herein. The number of cold trap assemblies attached to a liquid metal coolant system can vary radically and will depend upon several things: the impurities to be removed, number of cold traps closed off for cleaning out impurities, and the heat removal properties of the cold trap coolants, just to name a few.

It is evident that there has been provided in accordance with the invention, a cold trap assembly that fully satisfies the objects, aims, and purposes set forth above. While the invention has been described in conjunction with the specific embodiments herein, it is apparent that many alternatives, modifications, and variations will be obvious to those skilled in the art in light of the foregoing description. Accordingly, it is intended to embrace all such alternatives, modifications, and variations as fall within the spirit and scope of the appended claims.

As my invention I claim:

1. In an apparatus for removing impurities from a liquid metal comprising a cold trap container substantially in the shape of an upright cylinder with a closed lower end and an opening in the upper end, an elongated tube-shaped regenerative heat exchanger having an outer tube-shaped member with one end thereof connected to said opening in said cold trap container with a liquid metal inlet means for the apparatus connected to the outer tube-shaped member adjacent the other end thereof, an inner tube-shaped member providing a liquid metal outlet means for the apparatus and extending from adjacent the liquid metal inlet means coaxially through the length of said outer tube-shaped member to form a annulus therebetween, said inner tube-shaped member further extending through said opening into said container to a liquid metal entrance of said inner member positioned adjacent and above said closed lower end of said container, baffle means forming a large surface area located within said cold trap container adjacent and above said entrance, coolant flow means positioned around said cold trap container, said inner tube-shaped member having at least one bleed hole therein positioned within the heat exchanger adjacent said liquid metal inlet means and adjacent said liquid metal outlet means whereby a small amount of the liquid metal entering the heat exchanger through said inlet means and a portion of the gases that have accumulated in the heat exchanger and the container will flow through said bleed hole to combine with the liquid metal in said inner tube-shaped member flowing out of the cold trap assembly through the liquid metal outlet means.

2. The apparatus defined in claim 1 wherein said inner tube-shaped member has spaced therearound adjacent the liquid metal outlet means, a plurality of bleed holes therein for the liquid metal and accumulated gases to flow therethrough.

3. A method of preventing the accumulation of cover gases within the cold trap assembly, which assembly removes impurities from a liquid metal flowing through said cold trap assembly, comprising the steps of:

providing a cold trap assembly consisting of a cold trap container, a baffle assembly or crystallization element in said container, a container coolant means about said container, a regenerative heat exchanger connected in fluid communication with said cold trap container;

providing the regenerative heat exchanger with one outer tube and one inner tube coaxially aligned to form an elongated annulus therebetween with the liquid metal entering the cold trap container through an inlet means in the outer tube adjacent one end thereof by flowing in said annulus between the inner and outer tubes, and the liquid metal leaving the cold trap container through an outlet means in said inner tube adjacent one end thereof where said one end of said inner and outer tubes are adjacent one another at an end portion of the elongated annulus;

providing by-pass means between said inlet means and said outlet means for a portion of said liquid metal entering said cold trap assembly to by-pass said cold trap container and baffle assembly with said by-pass means extending from a position adjacent said inlet means to a position adjacent said outlet means;

flowing said portion of said liquid metal entering said cold trap assembly through said by-pass means;

flowing a portion of the cover gases that may have accumulated in said cold trap assembly through said by-pass means with said portion of said liquid metal thereby preventing the accumulation of cover gases in the cold trap assembly.

4. The method according to claim 3, further comprising the steps of providing the by-pass means as a bleed hole in a tube wall adjacent the liquid metal inlet means and the liquid metal outlet means.

5. The method of claim 3, further comprising the flowing of said portion of the cover gas and said portion of the liquid metal through the by-pass means as a substantial continuous bleeding action so long as liquid metal is flowing through the cold trap assembly.

6. The method of claim 3 further comprising the step of flowing a coolant through said container coolant means for cooling the liquid metal in said cold trap container to a temperature below the saturation temperature of the impurities to be removed from said liquid metal whereby said impurities nucleate or precipitate upon said baffle assembly or crystallization element.

* * * * *